US009239132B1

(12) United States Patent
Wang et al.

(10) Patent No.: US 9,239,132 B1
(45) Date of Patent: Jan. 19, 2016

(54) LUBRICATION PACKAGE

(71) Applicants: Tie Chun Wang, Taipei (TW); Herman Chang, Rancho Dominguez Hills, CA (US)

(72) Inventors: Tie Chun Wang, Taipei (TW); Herman Chang, Rancho Dominguez Hills, CA (US)

(73) Assignees: Tie Chun Wang, Taipei (TW); Herman Chang, Rancho Dominguez Hills, CA (US)

( * ) Notice: Subject to any disclaimer, the term of this patent is extended or adjusted under 35 U.S.C. 154(b) by 167 days.

(21) Appl. No.: 13/725,672

(22) Filed: Dec. 21, 2012

(51) Int. Cl.
*F16N 25/00* (2006.01)
*B02C 23/18* (2006.01)
*B65D 27/00* (2006.01)

(52) U.S. Cl.
CPC ..................................... *F16N 25/00* (2013.01)

(58) Field of Classification Search
CPC .. B02C 18/007; B02C 18/16; B02C 2018/166
USPC .............................. 184/13.1; 206/524.1, 525
See application file for complete search history.

(56) References Cited

U.S. PATENT DOCUMENTS

| 7,387,270 | B2* | 6/2008 | Wang | 241/301 |
| 7,793,876 | B2* | 9/2010 | Wang | 241/301 |
| 8,708,261 | B2* | 4/2014 | Allen | 241/100 |
| 2006/0169619 | A1* | 8/2006 | Wang | 206/484 |
| 2006/0243631 | A1* | 11/2006 | Duke | 206/525 |
| 2007/0080252 | A1* | 4/2007 | Pierce et al. | 241/236 |

FOREIGN PATENT DOCUMENTS

| DE | 3426979 A1 | 1/1986 |
| DE | 8702207 U1 | 6/1987 |

* cited by examiner

*Primary Examiner* — William E Dondero
*Assistant Examiner* — Robert T Reese
(74) *Attorney, Agent, or Firm* — Venable, LLP; Stefan J. Kirchanski

(57) ABSTRACT

A lubrication package for lubrication of paper shredders wherein a lubricant is sandwiched between two coversheets which are sealed together near their peripheral edges to contain the lubricant. When the package is inserted into an operating paper shredder, the coversheets are shredded and release the lubricant to lubricate the shredding mechanism. The lubricant is prevented from all migrating towards one of the peripheral edges by a plurality of interior seals that divide the package into several sub-regions.

6 Claims, 3 Drawing Sheets

LUBRICATION PACKAGE

CROSS-REFERENCE TO PRIOR APPLICATIONS

Not Applicable

U.S. GOVERNMENT SUPPORT

Not Applicable

BACKGROUND OF THE INVENTION

1. Field of the Invention

This invention relates to a paper shredder, particularly to a lubricating packet designed to be shredded by a paper shredders to provide lubrication to the cutting blades of the paper shredder.

2. Description of the Background

Paper shredders are common appliances that are used to render paper documents unreadable to prevent theft of private information such as financial information. It is relatively simple for someone to rifle through one's trash to discover account numbers and other data that can be used to perpetrate identity theft. Therefore, virtually all businesses and many private individuals shred all documents that contain private information. With a paper shredder papers are generally introduced through a slot or chute into a shredding mechanism. Most paper shredders employ a plurality of cutting blades spaced apart along counter rotating shafts as a shredding mechanism. A nip is formed between two such blade-bearing shafts, and sheets of paper inserted into the nip are sheared into fragments. Shredders can be generally classed into two types according to the shape of the fragments they produce. In the simplest type of shredder, the strip-cut shredder, the cutting blades on the rotating shafts cut the paper only in a longitudinal direction to form strips. While fairly difficult, it is possible to reassemble the strips to "regenerate" the original document and thus read the confidential information thereon. Most newer shredder are "cross cut" shredders that have blades that include more than one cutting edge per blade with these extra cutting edges disposed on the shaft to first cut the paper along a longitudinal direction into strips and to then cut the strips at an angle to the longitudinal direction to cut the strips into paper chips. These shredders produce a product not unlike confetti so that it is virtually impossible to reassemble the original document.

Unfortunately, the blades of the shredder—particularly the cross-cut shredder—become heated in use and bind dust and debris resulting from the shredding process. Furthermore, depending on air quality and humidity levels the blades may begin to corrode with time. These processes gradually reduce the efficiency of the shredders and may ultimately cause them to fail. One way of avoiding this problem is to apply a lubricant such as oil to the cutting mechanism. Unfortunately, it is relatively difficult to directly apply a lubricant to the rotating blades. Because of safety concerns the blades are usually sealed within the system and not readily accessible. Attempting to pour oil down the inlet slot or chute of an operating shredder is messy and may result in lubricant being sprayed back on the user—or worse.

The prior art solution to this problem is to enclose the lubricant in some sort of package. For example, patent applications to Zettler (DE 8702207) and to Holland (DE 3426979) contemplate enclosing a lubricant-bearing sheet, such as oil-soaked paper, in oil-resistant cover layers. Such a compound sheet or lubrication package can be easily and cleanly handled and inserted into an operating shredder to lubricate the shredder blades as they cut the compound sheet into fragments. These prior art references also contemplate sealing a liquid lubricant such as oil directly between oil-resistant cover layers and dispensing entirely with the lubricant-bearing sheet. In attempting to commercialize these prior art designs, it was discovered that an unanticipated problem was that as the lubrication package was drawn into the shredding mechanism, it was compressed resulting in the release of a puff of air containing oil droplets. These droplets can squirt out of the machine and/or deposit oil in regions of the shredder that should not receive oil. This problem is more severe in the liquid oil designs where the lubrication substrate is entirely dispensed with.

One solution to this problem is shown in U.S. Pat. No. 7,793,876 which discloses a plurality of vents arranged peripherally around the edges of the lubrication package. Because of the arrangement of peripheral seals, the lubricant is retained within the lubrication package until it is compressed during the shredding process. At that time, the vents relieve built up pressure and direct the compressed air and any oil droplets into the shredding mechanisms. The system works particularly well with substrate-free designs so that such designs have become preferred. However, the inventors have now realized another unanticipated problem with such designs.

In a substrate-free lubrication package, the liquid oil may redistribute within the sealed package in response to gravity. If the sheets are stored flat with their surfaces more or less parallel to the surface of the Earth, there is no problem. However, if the sheets are stored with their surfaces perpendicular to the surface of the Earth, the oil may pool at the lower edge of the package. Depending on the storage orientation of the packages, this can result in regions of the shredder blades not receiving sufficient lubricant. For example, if the oil is pooled along the left-hand edge of the lubrication sheet, the shredder blades towards the right-hand edge of the mechanism will not be properly lubricated.

SUMMARY OF THE INVENTION

A prior art lubrication package consists of a liquid lubricant sandwiched between two coversheets which are sealed at their edges by two spaced apart seals—an inner and an outer seal. A plurality of vent holes is provided between the two seals. When this lubrication package is fed through the shredding mechanism of a paper shredder, the enclosed oil and any entrapped air may become pressurized as the sheet is squeezed. The air and oil are able to force their way past the inner seal and exit the vent holes to coat the cutting blades. However, the liquid oil may redistribute within the sealed package during storage in response to gravity. This can result in uneven lubrication of the mechanism.

In the improved package a plurality of interior seals are used to divide the interior area of the package into four or more sub-cavities or regions. The interior seals prevent edge pooling of the lubricant in response to gravity. Instead of moving to the lowest edge, part of the lubricant is stopped near the center of the package by the interior seal, thereby ensuring more even distribution of the lubricant.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved design for substrate-free lubrication packages that ensure even distribution of the lubricant.

Figure 1:
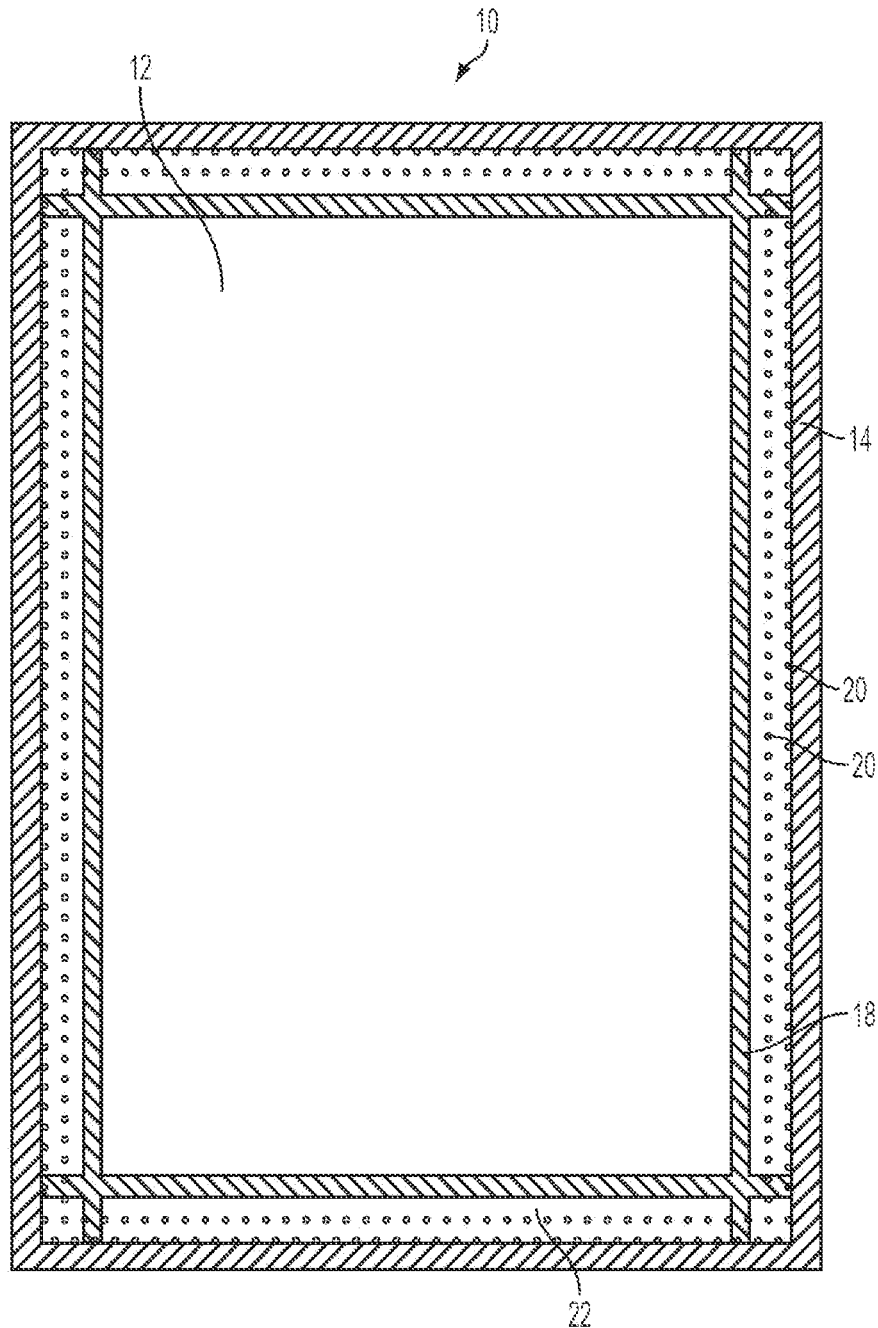
FIG. 1 is a drawing of a surface view of a prior art lubrication package.
Figure 2:
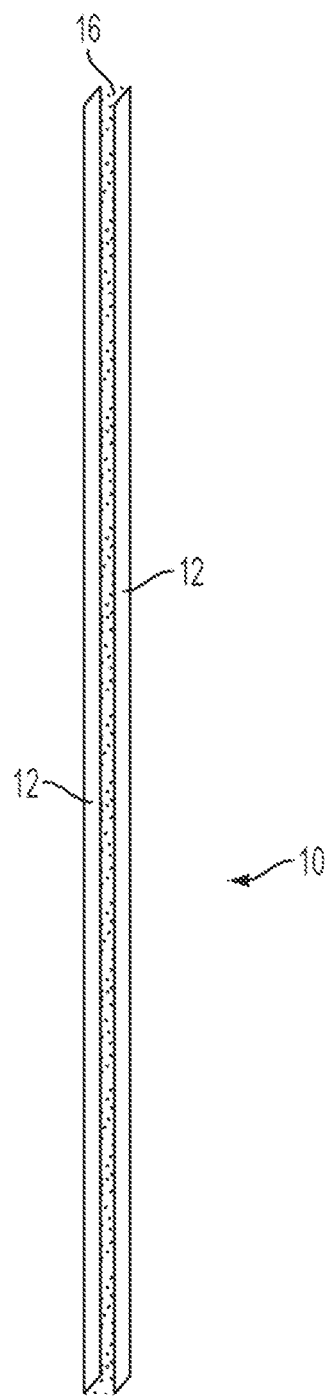
FIG. 2 is a cross-section of a lubrication package of the present invention.

FIG. 1 shows a surface view of a prior art lubrication package as disclosed in U.S. Pat. No. 7,793,876. The lubrication package 10 is formed from two cover layers 12 (only one of which can be seen in this view) laminated together at an outer peripheral seal 14. As shown in FIG. 2 which is a cross-section of the lubrication package 10, the cavity or space between the two cover layers 12 is filled with lubricant in the form of liquid oil 16. Generally, the cavity or space is quite thin and has been exaggerated in the drawing for sake of clarity. Any lubricating oil of mineral, animal or vegetable origin can be used. Preferably, the oil will be colorless and non-toxic. As shown in FIG. 1, an inner peripheral seal 18 is spaced apart (by about 1 cm) from the outer peripheral seal 14 thereby preventing the oil-filled cavity or space from extending entirely from edge to edge. The peripheral seals 14, 18 are essentially identical and are formed by a heat-sealing tool that simultaneously forms the two parallel seals. Other welding processes such as ultrasonic welding or use of adhesives could also be used to form the seals. A double row of vent holes 20 are punched through both cover layers in the peripheral region 22 between the two peripheral seals 14, 18.

When this lubrication package 10 is fed through the shredding mechanism of a paper shredder, the enclosed oil 16 and any entrapped air may become pressurized as the sheet is squeezed. When this happens, the air and oil are able to force their way past the inner seal 18 which is not particularly strong. If the vent holes 20 were not present, the air and oil could also force their way past the outer peripheral seal 14 and spurt out along the edge of the lubrication package 10 possibly exiting the shredder or striking some part of the mechanism that should not be lubricated. However, with the vent holes 20 present the oil and air exit the vent holes 20 and coat the rotating blades. As explained above, a potential problem with such a lubrication package is a tendency for the lubricant to pool and become unevenly distributed in response to gravity.

Figure 3:
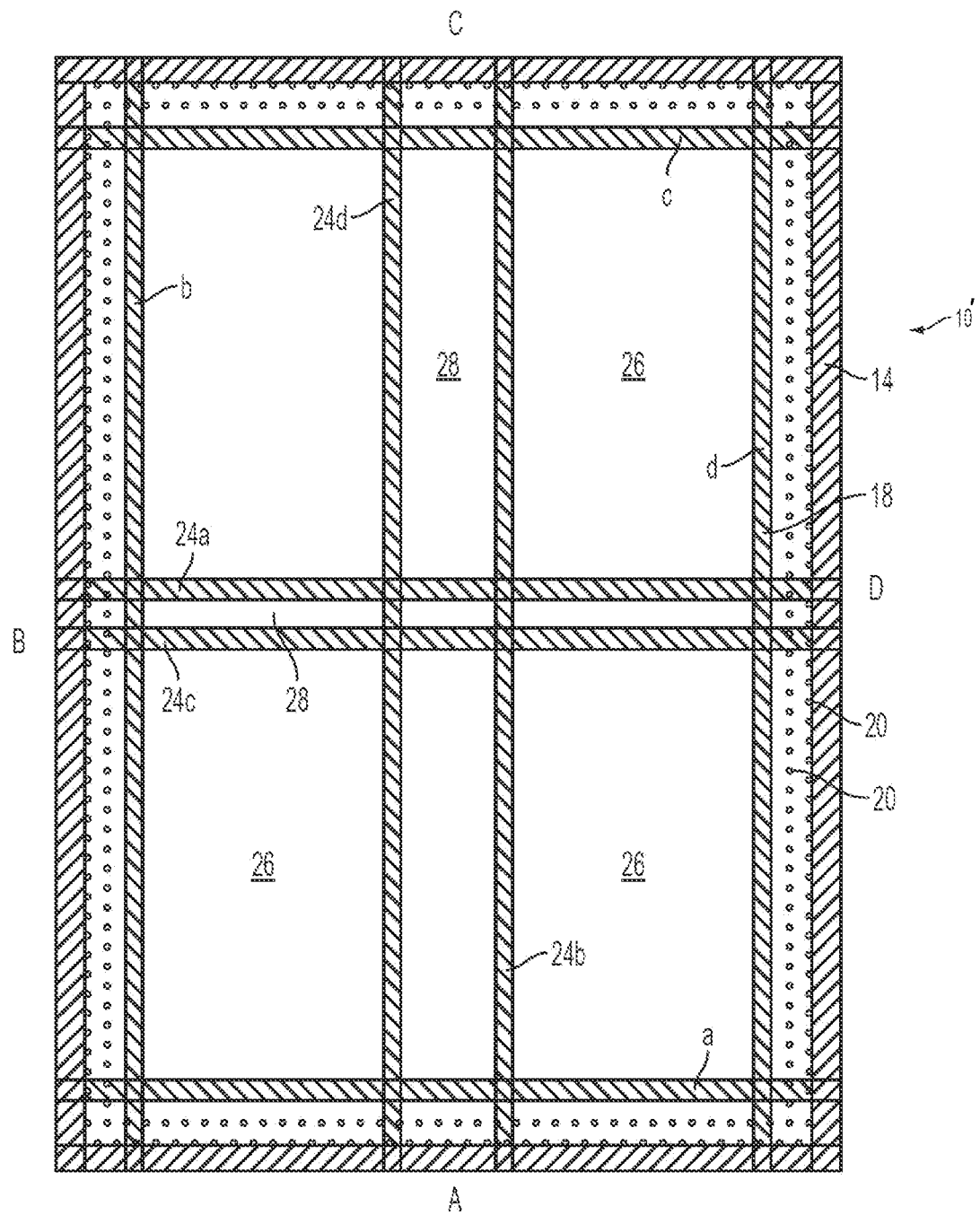
FIG. 3 is surface view of the lubrication package of FIG. 2.

FIG. 3 shows an improved lubrication sheet 10' showing a simple but elegant solution to this pooling problem. A plurality of interior seals 24 (formed similarly to the peripheral edge seals 14, 18) are used to divide the interior cavity into four or more sub-cavities or regions 26. In the drawing paired interior seals 24 are shown as having dimensions similar to the peripheral edge seals. The invention would operate if only single (as opposed to spaced apart double) or even multiple seals were used. Nor is it necessary for the interior seals to be parallel to each other. The notion is to prevent the interior cavity from extending the width (or length) of the lubrication package 10' from edge to edge to prevent edge pooling of the lubricant. In the package 10' shown in FIG. 3, the interior is divided into four major sub-cavities or regions 26 as well as five minor sub-cavities 28. This type of division is adequate to ensure essentially even distribution of the lubricant although it is possible to employ a larger number and different arrangement of sub-cavities.

The operation of this solution is illustrated by the reference signs A, B, C, and D. If the lubrication sheet 10' is stored with "A" representing the lowermost edge, the lubricant will move towards the peripheral seal marked "a." Because of interior seal 24a lubricant from the upper half does not move past the center of the sheet thus ensuring improved distribution of the lubricant. Similarly, turning the sheet to make "B," "C" or "D" the lowermost edge causes lubricant to move towards the peripheral seals marked "b," "c" or "d," respectively. This is prevented by interior seals 24b, 24c or 24d, respectively. Thus, the present invention solves both the problem of lubricant spurting and the problem of lubricant pooling near one edge of the lubrication sheet in response to gravity during storage.

The interior seals 24 are most simply implemented by having the seals 24 run approximately parallel to the peripheral seals 14, 18. However, this orientation is not obligate. The interior seals 24 could be configured to make various angles other than right angles with the peripheral seals 14, 18. Also, it is not required that the interior seals form straight lines as long as they are disposed to prevent migration of a majority of the enclosed lubricant to one of the peripheral seals 18.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A lubrication package sized for insertion into the input slot of a paper shredder to be shredded so as to lubricate the cutting blades of the paper shredder, said package comprising:
   two juxtaposed cover layers;
   an outer peripheral seal bonding the two cover layers together at or near their lengthwise and widthwise peripheral edges;
   a lubricant disposed in a space between the two bonded cover layers;
   an inner peripheral seal essentially parallel to and spaced apart from the outer peripheral seal to separate the space into a central region and one or more peripheral regions between the inner peripheral seal and the outer peripheral seal;
   a plurality of vent holes disposed in the one or more peripheral regions; and
   at least two interior seals, one interior seal extending lengthwise between the inner peripheral seals and one interior seal extending widthwise between the inner peripheral seals, disposed to separate the central region into sub-regions to prevent migration of all the lubricant to the inner peripheral seal adjacent to either the lengthwise or the widthwise peripheral edges.

2. The lubrication package according to claim 1, wherein the at least two interior seals are substantially straight.

3. The lubrication package according to claim 2, wherein two of the at least two interior seals are substantially perpendicular to each other.

4. The lubrication package according to claim 3, wherein the substantially perpendicular interior seals cross one another forming a point of intersection with said point of intersection centrally disposed within the central region, thereby dividing the central region into four substantially equal sub-regions.

5. The lubrication package according to claim 4, wherein one of the perpendicular interior seals is substantially parallel to one of the peripheral seals.

6. The lubrication package according to claim 3, wherein each of the two perpendicular interior seals is accompanied by a spaced apart parallel interior seal.

\* \* \* \* \*